(No Model.)
C. F. KUNTZ.
ROACH TRAP.
No. 501,350. Patented July 11, 1893.
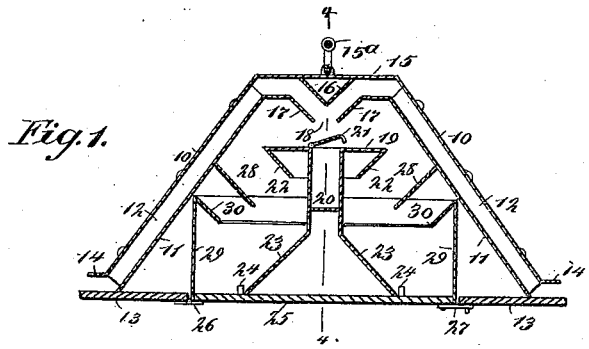
WITNESSES:
F. McArdle
C. Sedgwick
INVENTOR
C. F. Kuntz
BY
Munn & Co
ATTORNEYS.

UNITED STATES PATENT OFFICE.

CHARLES F. KUNTZ, OF ST. LOUIS, MISSOURI.

ROACH-TRAP.

SPECIFICATION forming part of Letters Patent No. 501,350, dated July 11, 1893.

Application filed March 21, 1893. Serial No. 466,998. (No model.)

*To all whom it may concern:*

Be it known that I, CHARLES F. KUNTZ, of St. Louis, Missouri, have invented a new and Improved Roach-Trap, of which the following is a full, clear, and exact description.

My invention relates to improvements in traps which are used for catching roaches and other vermin; and the object of my invention is to produce a cheap and simple trap which is constructed in such a way as to entice roaches and other vermin into it, which is adapted to be easily cleaned out when necessary, and which is made in such a manner that when once the roach or other bug is in it he cannot get out.

To this end my invention consists in a roach trap, the construction of which will be hereinafter described and claimed.

Reference is to be had to the accompanying drawings forming a part of this specification, in which similar figures of reference indicate corresponding parts in all the views.

Figure 1 is a central cross section on the line 1—1 in Fig. 3. Fig. 2 is an inverted plan of the trap. Fig. 3 is a plan of the same. Fig. 4 is a cross section on the line 4—4 in Fig. 1. Fig. 5 is a detail cross section of the lower box of the trap. Fig. 6 is a detail cross section of the stand and bait box; and Fig. 7 is a plan view of the bait box and stand.

The trap is provided with an exterior casing 10 and an inner casing 11, these being of similar shape, and having inclined sides which are parallel with each other so that a space or passageway is formed between them up which a roach, or other bug, may crawl. The lower edge of the casing 10 does not extend quite to the bottom of the trap on the inclined sides, but is bent outward to form a shield 14 which is parallel with the base 13 to which the trap is secured. The passageway 12 and the entrance beneath the hood or shield 14 lead to the trap, and this arrangement causes the roaches to readily enter the trap, as it is their nature to crawl beneath articles and into cracks. The casings 10 and 11 have flat tops, as shown at 15, and on the outer casing is a suitable handle 15ᵃ by which the trap may be carried about. On the under side of the flat top of the outer casing 10, is a depending rib 16 which is V-shaped in cross section, and the sides of which are parallel with the inclined walls 17 of the top of the inner casing 11, these converging inclined walls terminating in an opening 18 large enough to permit the ready passage of a bug or roach. Beneath the opening 18 is a stand having a flat top 19, and this stand is adapted to carry the bait box 20 and also afford a place on which the bugs and roaches alight as they drop through the opening 18. This is an important feature of the invention, as the arrangement of the bait box brings the bait directly beneath the opening 18 so that its odor will pass upward through said opening and outward through the passageways 12, and the roaches will follow up the odor in search of food.

Another important feature of the stand is that it affords a place, within easy reach of the inclines 17, on which the roaches may land. If the stand were not located in this place, the roaches and bugs when they reached the inclines 17 and looked through the opening 18, would be somewhat dismayed by the distance between them and the trap bottom and would draw back and fail to enter the trap, but as the stand is so near they pass readily downward upon its top. The bait box 20 carried by the stand has a perforated lid 21 which comes directly beneath the opening 18 and which enables the food or bait to be readily inserted in or removed from the box. The top 19 of the stand has inwardly inclined flanges 22, on its under side, which when a bug or roach has passed downward, prevent him from climbing back. The stand has a broad base 23 which sits between the lugs 24 on a swinging lid 25 which is hinged, as shown at 26, to the base 13, and which, when swung into a horizontal position, is held thus by suitable hasps or catches 27, this arrangement enabling the trap to be easily opened when necessary by simply unfastening the hasps and swinging down the lid.

On the interior of the trap, opposite the vertical portion of the stand and secured to the inner casing 11, are downwardly-extending flanges 28 which are intended to obstruct the return of the vermin in the trap to the opening 18, and the trap is provided also with a box 29 carried by the lid 25 and having at its upper edge, inwardly and downwardly-inclined flanges 30 which also prevent the vermin in the box or trap from crawling up its sides.

When the trap is to be used, the bait is placed in the box 20 and its odor passes through the opening 18 and out through the passageways 12. The roaches and other bugs which may be near the trap, smell the bait and pass in search of it through the passageways 12 down through the opening 18 upon the stand 19, and finally pass downward over the edge of the stand upon the flanges 28 and from thence to the bottom of the trap. The roaches and bugs, after alighting upon the stand, are either crowded off by others who come in through the opening 18, or see the flanges 28 so near that they jump upon the said flanges and slide from them to the trap bottom from which they cannot return.

Having thus described my invention, I claim as new and desire to secure by Letters Patent—

1. A roach trap, comprising a casing having hollow inclined walls with an opening at the bottom, the inner wall having also an opening at the top leading to the interior of the trap, downwardly-extending flanges arranged within the interior of the trap, and a lid or door at the bottom, substantially as described.

2. A roach trap, comprising a casing having a stand within it, inclined passageways leading up the side of the trap and to an opening above the stand, and a swinging lid or door forming the bottom of the trap, substantially as described.

3. A roach trap, comprising a casing having inclined passageways opening at its sides and near the bottom, the passageways leading to an opening in the top of the trap, a stand and bait box arranged beneath the opening, inclined flanges arranged within the trap and projecting downward and a lid in the bottom of the trap, substantially as described.

4. A roach trap, comprising a casing having a swinging bottom, a stand carried by the casing and having a bait box at its top, a perforated lid for the bait box, an opening for the inner portion of the casing, and inclined passageways leading from the sides of the casing to the opening therein, substantially as described.

5. A roach trap, comprising a casing having a swinging bottom, a stand carried by the bottom and having a bait box in its top, a perforated cover for the box, inwardly-extending flanges arranged within the casing, and inclined passageways leading from the sides of the casing and terminating in an opening above the stand, which opening has inclined walls, substantially as described.

CHARLES F. KUNTZ.

Witnesses:
C. A. SCHNAKE,
J. HENRY SCHMIDT.